(12) United States Patent
Li et al.

(10) Patent No.: US 12,469,233 B2
(45) Date of Patent: Nov. 11, 2025

(54) VIDEO PROCESSING METHOD AND APPARATUS, AND DEVICE, AND STORAGE MEDIUM

(71) Applicant: Lemon Inc., Grand Cayman (KY)

(72) Inventors: Anda Li, Los Angeles, CA (US); Jiali Pan, Beijing (CN); Xinglun Liang, Beijing (CN); Zihao Chen, Los Angeles, CA (US); Fan Zhang, Beijing (CN)

( * ) Notice: Subject to any disclaimer, the term of this patent is extended or adjusted under 35 U.S.C. 154(b) by 19 days.

(21) Appl. No.: 18/569,165

(22) PCT Filed: Sep. 16, 2022

(86) PCT No.: PCT/SG2022/050662
§ 371 (c)(1),
(2) Date: Dec. 11, 2023

(87) PCT Pub. No.: WO2023/075677
PCT Pub. Date: May 4, 2023

(65) Prior Publication Data
US 2024/0265648 A1   Aug. 8, 2024

(30) Foreign Application Priority Data

Oct. 26, 2021  (CN) .......................... 202111250396.1

(51) Int. Cl.
*G06T 19/00* (2011.01)
*G06F 3/04842* (2022.01)

(52) U.S. Cl.
CPC ........ *G06T 19/006* (2013.01); *G06F 3/04842* (2013.01); *G06T 2200/24* (2013.01); *G06T 2210/32* (2013.01); *G06T 2210/61* (2013.01)

(58) Field of Classification Search
CPC ............... G06T 19/006; G06T 2200/24; G06T 2210/32; G06T 2210/61; G06F 3/04842;
(Continued)

(56) References Cited

U.S. PATENT DOCUMENTS

2016/0321833 A1* 11/2016 Chong ................... G06T 19/006
2018/0234708 A1*  8/2018 Chong ................. H04N 21/472
(Continued)

FOREIGN PATENT DOCUMENTS

| CN | 1805354 A | 7/2006 |
|---|---|---|
| CN | 104780458 A | 7/2015 |

(Continued)

OTHER PUBLICATIONS

ISA China National Intellectual Property Administration, International Search Report Issued in Application No. PCT/SG2022/050662, Mar. 15, 2023, 10 pages.

(Continued)

*Primary Examiner* — Jeffery A Brier
(74) *Attorney, Agent, or Firm* — Alleman Hall & Tuttle LLP

(57) ABSTRACT

Embodiments of the disclosure provide a method and a video processing apparatus, an electronic device, a computer-readable storage medium, a computer program product, and a computer program. A terminal device obtains coordinate information of a target part of a collected video picture in response to a selection operation for a first effect; displays the first effect on the target part of the video picture according to the coordinate information; transmits a collected video and the coordinate information of the target part in each video picture of the video are transmitted to a server in response to a collection completion instruction for the video. The server adds a second effect corresponding to the first effect to the target part of each video picture according to the coordinate information.

14 Claims, 6 Drawing Sheets

(58) Field of Classification Search
CPC . G06F 3/04845; G06F 3/0482; G11B 27/031;
G11B 27/34; H04N 21/234; H04N 21/44;
H04N 21/472; H04N 21/47205
See application file for complete search history.

(56) References Cited

U.S. PATENT DOCUMENTS

| 2020/0029028 | A1* | 1/2020 | Kim | H04N 7/147 |
| 2020/0195980 | A1* | 6/2020 | Chen | H04N 21/4788 |
| 2024/0333999 | A1* | 10/2024 | Li | H04N 21/4318 |

FOREIGN PATENT DOCUMENTS

| CN | 108022279 | A | | 5/2018 | |
| CN | 109495790 | A | | 3/2019 | |
| CN | 111447504 | A | | 7/2020 | |
| CN | 112291590 | A | * | 1/2021 | ......... H04N 21/4312 |
| CN | 112929683 | A | | 6/2021 | |
| CN | 113516742 | A | | 10/2021 | |
| IN | 202047036240 | A | | 9/2020 | |
| WO | 2018024179 | A1 | | 2/2018 | |

OTHER PUBLICATIONS

China National Intellectual Property Administration, Office Action and Search Report Issued in Chinese Application No. 202111250396. 1, Mar. 28, 2025, 22 pages.
Liu, Y, "An example of scene special effects production," 2010 Shanghai World Expo World Meteorological Organization Museum Animation Production, No. 5, May 15, 2011, 2 pages.

* cited by examiner

VIDEO PROCESSING METHOD AND APPARATUS, AND DEVICE, AND STORAGE MEDIUM

CROSS-REFERENCE TO RELATED APPLICATION(S)

This application is a U.S. National Stage Application of PCT Application Serial No. PCT/SG2022/050662, filed on Sep. 16, 2022, which claims the priority to Chinese Patent Application No. 202111250396.1, filed to the Chinese Patent Office on Oct. 26, 2021 and entitled "Video Processing Method and Apparatus, and Device, and Storage Medium", the disclosures of which are incorporated herein in its entirety by reference.

FIELD

Embodiments of the disclosure relate to the technical field of video processing, and particularly relate to a method and a video processing apparatus, an electronic device, a computer-readable storage medium, a computer program product, and a computer program.

BACKGROUND

As the Internet technology develops, short video services gradually rise. User requires more pleasing and faster video processing processes and better video effects.

In the related art, a user can add an effect to a shot video and interact with the effect in real time while shooting the video with a terminal device. In this way, the video can be more pleasing. However, the effect added during real-time interaction is unsatisfactory.

SUMMARY

Embodiments of the disclosure provide a method and a video processing apparatus, an electronic device, a computer-readable storage medium, a computer program product, and a computer program, so as to solve a problem that an effect added during real-time interaction is unsatisfactory during video shooting.

In a first aspect, an embodiment of the disclosure provides a video processing method. The video processing method is applied to a terminal device and includes: obtaining, in response to a selection operation for a first effect, coordinate information of a target part in a video picture collected by the terminal device; displaying the first effect on the target part in the video picture according to the coordinate information; and transmitting, in response to a collection completion instruction for a video, the collected video and the coordinate information of the target part in each video picture of the video to a server, to obtain a target video output by the server, where the target video is generated by adding a second effect corresponding to the first effect to the target part in each video picture by the server according to the coordinate information, and effect files of both the first effect and the second effect are in a preset scene format.

In a second aspect, an embodiment of the disclosure provides a video processing method. The video processing method is applied to a server and includes: receiving a video and coordinate information transmitted by a terminal device, where the coordinate information is coordinate information of a target part in each video picture of the video; and adding a second effect corresponding to a first effect to the target part in each video picture of the video according to the coordinate information, and obtaining a target video, where the first effect is an effect added by the terminal device to the target part, and effect files of both the first effect and the second effect are in a preset scene format.

In a third aspect, an embodiment of the disclosure provides a video processing apparatus. The video processing apparatus is applied to a terminal device and includes:
- an obtaining module configured to obtain, in response to a selection operation for a first effect, coordinate information of a target part in a video picture collected by the terminal device;
- a processing module configured to display the first effect on the target part of the video picture according to the coordinate information; and
- a transmission module configured to transmit, in response to a collection completion instruction for a video, the collected video and the coordinate information of the target part in each video picture of the video to a server to obtain a target video output by the server, where the target video is generated by adding a second effect corresponding to the first effect to the target part of each video picture by the server according to the coordinate information, and effect files of both the first effect and the second effect are in a preset scene format.

In a fourth aspect, an embodiment of the disclosure provides a video processing apparatus. The video processing apparatus is applied to a server and includes:
- a reception module configured to receive a video and coordinate information transmitted by a terminal device, where the coordinate information is coordinate information of a target part in each video picture of the video; and
- a processing module configured to add a second effect corresponding to a first effect to the target part of each video picture of the video according to the coordinate information, and obtain a target video, where the first effect is an effect added by the terminal device to the target part, and effect files of both the first effect and the second effect are in a preset scene format.

In a fifth aspect, an embodiment of the disclosure provides an electronic device. The electronic device includes: at least one processor and a memory. The memory stores a computer-executable instruction. The at least one processor executes the computer-executable instruction stored in the memory, causing the at least one processor to execute the video processing method according to the first aspect or the second aspect.

In a sixth aspect, an embodiment of the disclosure provides a computer-readable storage medium. The computer-readable storage medium stores a computer-executable instruction. A processor implements the video processing method according to the first aspect or the second aspect when executing the computer-executable instruction.

In a seventh aspect, an embodiment of the disclosure provides a computer program product. The computer program product includes: a computer program. The computer program implements the video processing method according to the first aspect and/or the second aspect when executed by a processor.

In an eighth aspect, an embodiment of the disclosure provides a computer program. The computer program implements the video processing method according to various possible designs of the first aspect and/or the second aspect when executed by a processor.

Embodiments of the disclosure provide the method and video processing apparatus, the electronic device, the computer-readable storage medium, the computer program product, and the computer program. The terminal device obtains the coordinate information of the target part in the video picture collected by the terminal device in response to the selection operation for the first effect; the first effect is displayed on the target part in the video picture according to the coordinate information. The terminal device transmits the collected video and the coordinate information of the target part in each video picture of the video to the server in response to the collection completion instruction for the video; and the server adds the second effect corresponding to the first effect to the target part in each video picture according to the coordinate information.

BRIEF DESCRIPTION OF THE DRAWINGS

In order to more clearly describe technical solutions in embodiments of the disclosure or in the prior art, the accompanying drawings required for the description of the embodiments or the prior art will be briefly introduced below. Apparently, the accompanying drawings in the following description are some embodiments of the disclosure. Those of ordinary skill in the art would also derive other accompanying drawings from these accompanying drawings without making inventive efforts.

DETAILED DESCRIPTION OF EMBODIMENTS

Figure 1:
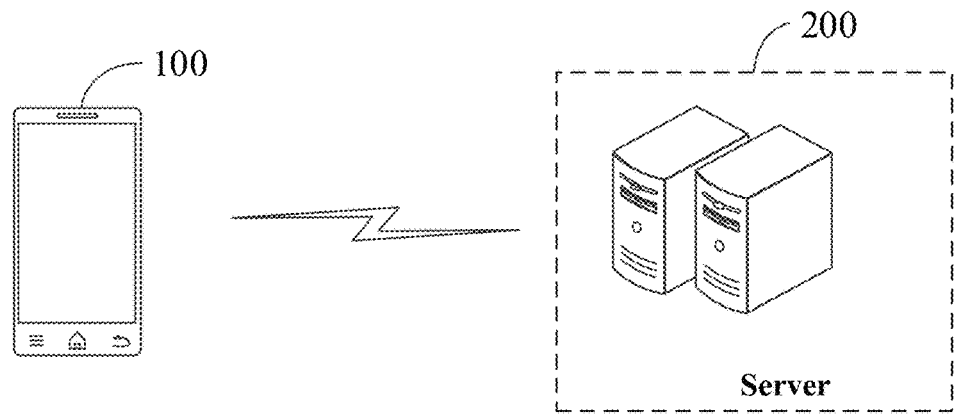
FIG. 1 is a schematic diagram of an application scene of a video processing method according to an embodiment of the disclosure.

For making objectives, technical solutions and advantages of embodiments of the disclosure more clearly, the technical solutions in the embodiments of the disclosure will be clearly and completely described below in conjunction with the accompanying drawings in the embodiments of the disclosure. Obviously, the described embodiments are some embodiments rather than all embodiments of the disclosure. Based on the embodiments of the disclosure, all other embodiments obtained by those of ordinary skill in the art without making creative efforts fall within the protection scope of the disclosure.

In the related art, a user can add an effect to a shot video and interact with an effect in real time while shooting the video with a terminal device. In this way, the video can be more pleasing. At present, the mainstream rendering technology of interactive effects is mostly based on a real-time rendering raster algorithm. The algorithm may implement real-time computation; such that interactivity of an effect is provided in a video shooting process. However, the rendering effect of the algorithm is poor, which can hardly satisfy the rendering needs of a user in a video processing process.

In view of that, embodiments of the disclosure provide a method and a video processing apparatus, an electronic device, a computer-readable storage medium, a computer program product, and a computer program. A first effect is added at a terminal device in real time, such that interactivity of effects is achieved, and meanwhile previewing of videos with added interactive effects is achieved. In addition, a server adds a second effect to a target part of a video offline according to coordinate information recorded in an interaction process, and a target video is obtained, such that a high-quality effect of effect rendering can be obtained, and meanwhile effect interactivity of the target video can be ensured.

Firstly, terms involved in the embodiments of the disclosure will be explained accordingly.

A universal scene description (USD) is a three-dimensional (3D) file format developed by Pixar, which is developed by c++, may be called by Python, and may be configured to generate, store and transfer 3D data in a production pipeline of movies and games.

Blender is a type of open-source software for three-dimensional graphics and images, which provides a series of solutions for animation short film making from modeling, animation, materials, rendering, audio processing, video editing, etc.

Maya is a type of three-dimensional animation software, which is applied to professional film and television advertisements, character animation, movie stunts, etc. Maya is high-end production software perfect in functions, flexible in work, high in production efficiency and extremely realistic in rendering at a movie level.

3D Studio Max is a type of software for three-dimensional animation rendering and producing based on a personal computer (PC) system.

Physically Based Rendering (PBR).
Global Illumination (GI).
Screen Space Ambient Occlusion (SSAO).
Ambient Occlusion (AO).
Environment Mapping (EM).
Skydome.
Bloom.
Point light.
Area light.

Then, an application scene of an embodiment of the disclosure will be illustrated in conjunction with FIG. 1.

FIG. 1 is a schematic diagram of an application scene of a video processing method according to an embodiment of the disclosure. With reference to FIG. 1, the scene includes: a terminal device 100 and a server 200.

The terminal device 100 may be a mobile terminal (for example, a mobile device having a video processing function, such as a smart phone, a palm computer and a tablet computer, and a wearable electronic device), a computer device (for example, a desktop computer, a notebook computer, an all-in-one machine, a smart home device, etc.), etc. In FIG. 1, the smart phone is taken as an example, which does not limit the disclosure.

In some embodiments, the terminal device 100 may be in communication with the server 200 by a wireless or wired network, and is configured to transmit data to the server 200. The wireless network may be a communication network of second-generation (2G), or third-generation (3G) or fourth-generation (4G) or fifth-generation (5G), or a wireless local area network, which is not limited herein.

In a video processing process, a user may shoot a video in real time by the terminal device 100, and select a desired effect in an interface of the terminal device 100, so as to add the effect to a target part of an interface of the collected video. The user may interact with the effect through an action at the target part, and meanwhile, the terminal device 100 may record coordinate information of the target part in real time.

Further, after video shooting is completed, the terminal device 100 may transmit the shot video and the coordinate information of the target part in each video picture of the video to the server 200, and the server 200 may add an offline effect to the target part of each video picture of the video according to the coordinate information, and obtain a target video.

It should be understood that FIG. 1 is only a schematic diagram of an application scene according to the embodiment of the disclosure. The embodiments of the disclosure do not limit types and the number of devices included in FIG. 1, and do not limit a positional relation between the devices in FIG. 1. For example, the application scene shown in FIG. 1 may further include a data storage device. The data storage device may be an external memory relative to the server 200 or an internal memory integrated into the server 200. In addition, the server 200 may be an independent server or a service cluster.

The technical solutions of the embodiments of the disclosure and how the technical solutions of the disclosure solve the above technical problems will be described in detail below in conjunction with the specific embodiments. The following several specific embodiments can be combined with each other, and the same or similar concepts or processes may not be repeated in some embodiments. The embodiments of the embodiments of the disclosure will be described below in conjunction with the accompanying drawings.

Figure 2:
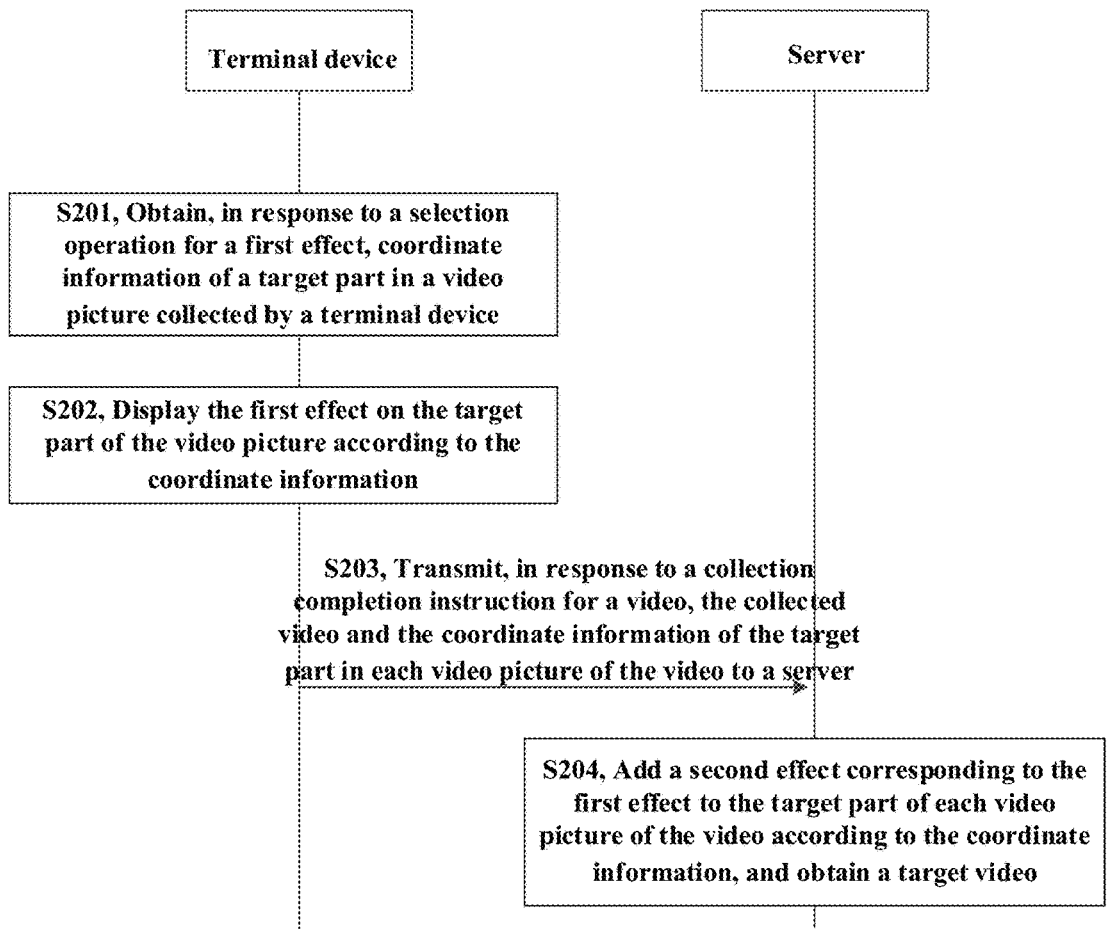
FIG. 2 is a first schematic interaction diagram of a video processing method according to an embodiment of the disclosure.

FIG. 2 is a first schematic interaction diagram of a video processing method according to an embodiment of the disclosure. With reference to FIG. 2, a video processing method according to an embodiment of the disclosure includes the following steps:

S201, in response to a selection operation for a first effect, a terminal device obtains coordinate information of a target part in a video picture collected by the terminal device.

In an embodiment of the disclosure, when a user shoots a video by the terminal device, an image collection module (for example, a camera module) of the terminal device may collect a video in real time and display a currently collected video picture in a display interface of the terminal device.

Figure 3:
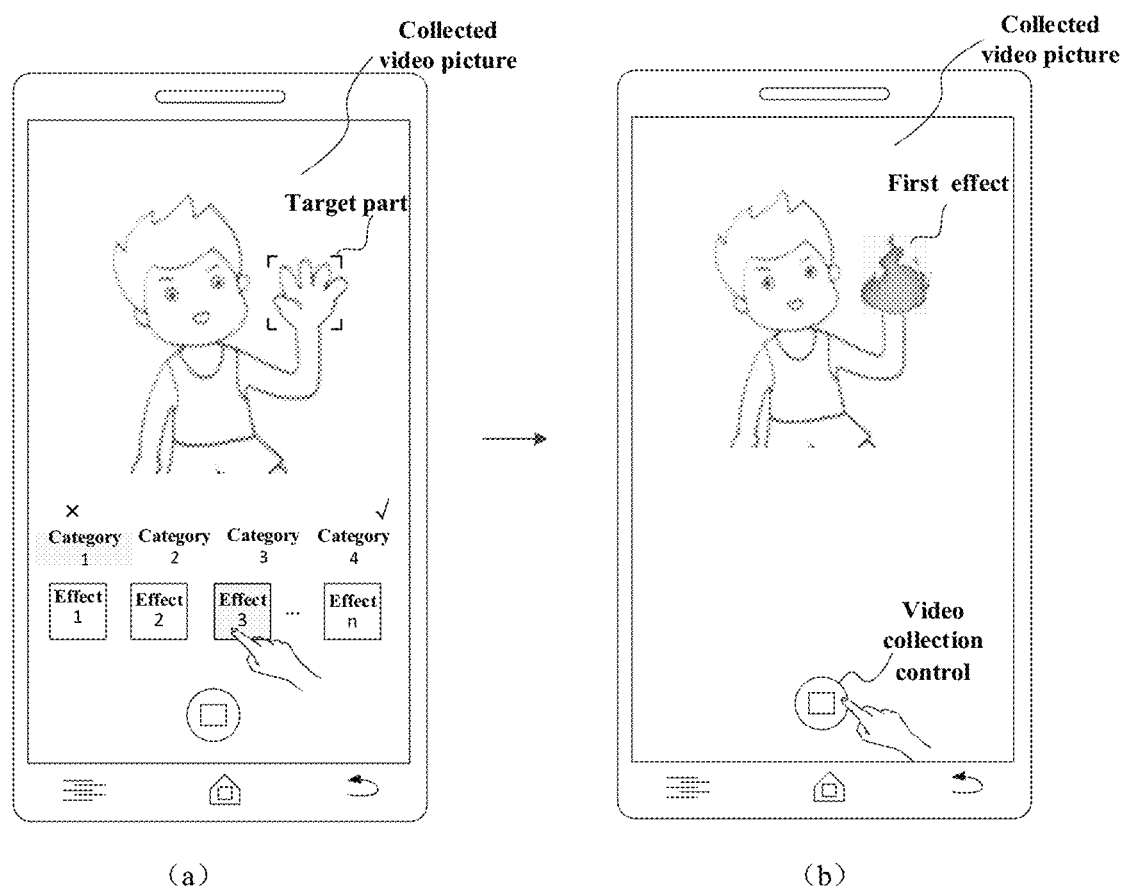
FIG. 3 is a schematic diagram of a terminal interface in a video processing process according to an embodiment of the disclosure.

Meanwhile, the display interface of the terminal device further displays a plurality of effects for the user to select from. FIG. 3 is a schematic diagram of a terminal interface in a video processing process according to an embodiment of the disclosure. As shown in (a) in FIG. 3, an interface of a terminal device displays a currently collected video picture and at least one category of effects, for example, category 1, category 2, category 3, and category 4. Each category of effects may include a plurality of effect stickers, and a user may select a first effect by clicking on the effect sticker.

For example, when the user selects the category 1, and the effect stickers contained in the category 1 are displayed in the interface, for example, effect 1, effect 2, effect 3 ... effect n, the user may select an effect sticker in the category 1 by sliding left and right, sliding up and down, etc.

In some embodiments, each effect sticker is bound to a specific part. The specific part is configured to determine a position where the effect sticker is displayed. The specific part may be a body part of a person or an animal, for example, a head, a hand, a foot, an eye, and a mouth.

Alternatively, each category of effect stickers is stickers corresponding to the same specific part. For example, the effect stickers in the category 1 are all effect stickers of the hand, the effect stickers in the category 2 are all effect stickers of the head, the effect stickers in the category 3 are all effect stickers of the eye, and the effect stickers in the category 4 are all effect stickers of the foot. It should be understood that the above binding relationships are illustrative and do not limit practical application.

Further, after the user selects an effect sticker, recognition may be conducted in the collected video picture according to a part bound to the effect sticker, such that a target part of the video picture is obtained.

For example, if the first effect selected by the user is effect sticker 3 in the category 1, and the effect sticker 3 is an effect sticker of the hand, a hand position of a person in the collected video picture may be recognized after the user clicking on the effect sticker 3, and then coordinate information of the hand is obtained in real time.

The coordinate information may be the coordinates of a key point of the target part. Different parts have different key points. For example, a key point of a hand may be one or more points of the center of a palm, a point where the root of a finger is located, and a point where a fingertip is located. A key point of an eye may be a point where an eyeball is located. Key points of other parts will not be repeated herein.

S202, the terminal device displays the first effect on the target part in the video picture according to the coordinate information.

Meanwhile, for the video picture of each video frame, after the coordinate information of the target part in the video picture is obtained, the first effect selected by the user is displayed on the target part in real time according to the coordinate information of the target part.

As shown in (b) in FIG. 3, if the effect 3 is a flame sticker of a hand, the after the user selects the sticker 3, the hand in the video picture is recognized, coordinate information of the hand is obtained, and the flame effect of the hand is displayed on the hand in real time according to the coordinate information.

It should be noted that the coordinate information of the target part in different video pictures is different in a video shooting process because the video pictures are collected in real time. Accordingly, the positions at which the first effect is added in each video picture are different.

Therefore, in the video shooting process, the user may change the coordinate information of the target part by moving the target part, such that the first effect may be moved synchronously with the movement of the target part, and the user interaction with the effect is achieved.

In other embodiments, the user may further control the first effect through a gesture operation for the target part. For example, taking an effect of a hand as an example, coordinates of a fingertip and the palm of the hand may be obtained, such that gesture changes such as opening and closing of the hand may be determined, and the size, the color, the shape and other features of the first effect are controlled. For example, taking the control of the size of the effect as an example, the first effect is enhanced when the hand is determined to be open, and the first effect is reduced when the hand is determined to be closed.

In the solution of the embodiment of the disclosure, the first effect is added at the terminal device in real time, such that interactivity of the effect can be achieved, and the video can be more pleasing. Meanwhile, the user may further preview the video added with an interactive effect, such that the user may view the added effect of the effect in real time, and the user experience is enhanced.

S203, in response to a collection completion instruction for a video, the terminal device transmits the collected video and the coordinate information of the target part in each video picture of the video to a server.

In practical application, different shooting scenes have different ways of obtaining the collection completion instruction. In an aspect, if a current shooting scene does not limit video shooting time, the collection completion instruction for the video may be triggered by the user actively. For example, further with reference to (b) in FIG. 3, at least one video collection control is displayed in a display interface of a terminal, and the start, pause and end of a video collection process are controlled with the video collection control. When the user triggers an ending function of the video collection control, the collection completion instruction for the video is generated.

In another aspect, in some video shooting scenes of video publishing platforms, the video shooting time may be limited. In this step, when the video shooting time reaches a time limit of the platform, the collection completion instruction for the video may be generated. It should be understood that when the video shooting time does not reach the time limit, the user may also actively pause or end the video shooting process through the method of the first aspect, and the specific solution will not be repeated herein.

In the embodiment of the disclosure, when the terminal device receives the collection completion instruction for the video, the terminal device transmits a collected video and the coordinate information of the target part in each video picture of the video to the server. The collected video picture does not include the first effect.

Alternatively, after the terminal device receives the collection completion instruction for the video, the video added with the first effect may further be displayed in the display interface of the terminal device, such that overall effect previewing of the video is achieved. Then, the user may confirm whether the server needs to perform further processing according to a preview situation. When the user triggers an instruction for further processing, the above data may be transmitted to the server.

S204, the server adds a second effect corresponding to the first effect to the target part of each video picture of the video according to the coordinate information, and obtains a target video.

In the embodiment of the disclosure, the first effect and the second effect are of the same category. For example, the if first effect is a flame effect of a hand, the second effect is also a flame effect of a hand. The terminal device needs to perform real-time rendering and support the user interaction with the effect. Therefore, the first effect having a poor rendering effect may be set to achieve real-time interaction. A rendering process of the server is to render the shot video without real-time rendering, which requires less real-time performance. Therefore, the second effect having a better rendering effect may be set to ensure a final rendering effect of the target video.

Therefore, the first effect may be a degraded rendering method of the second effect. Still taking the flame effect as an example, the second effect may be a volume rendering method, and the first effect may be a particle rendering method.

In practical application, a rendering method of the second effect generally does not support online rendering, and cannot provide interactivity of an effect. Although the first effect may support online rendering and provide interactivity of an effect, its rendering effect is poor. In the embodiment of the disclosure, effect files of both the first effect and the second effect may be set in a preset scene format, such that interactivity of an effect is achieved, while a rendering effect is ensured. The preset scene format is a universal scene description (USD) for example.

In the video processing method according to the embodiment of the disclosure, the first effect is added at the terminal device in real time, such that interactivity of an effect can be achieved, and meanwhile the video can be previewed. In addition, the server adds the second effect to the target part of the video according to the coordinate information recorded in the interaction process, such that a high-quality effect of effect rendering can be obtained while interactivity of an effect of the target video can be achieved.

In a specific scene, as shown in (a) in FIG. 3, in the video shooting process, after the user selects the effect 3 (for example, a flame effect of a hand) in the category 1 in the interface, the terminal device may automatically recognize the target part (that is, the hand) corresponding to the effect 3 in the video picture, and meanwhile obtain the coordinate information of the target part in the video picture.

Further, according to the coordinate information of the target part, the effect 3 is displayed at a position corresponding to the coordinate information, such that the flame effect of the hand is added to the target part. In this way, the picture shown in (b) in FIG. 3 is obtained. In this case, the user may adjust an action or a position of the target part according to the displaying situation of the first effect in the video picture, so as to achieve the purpose of previewing.

Further, when the user operates the video collection control in the video picture so as to complete video collection, the terminal device may transmit the video collected by the terminal device and the coordinate information of the target part in each video picture of the video to the server according to the received collection completion instruction.

Figure 4:
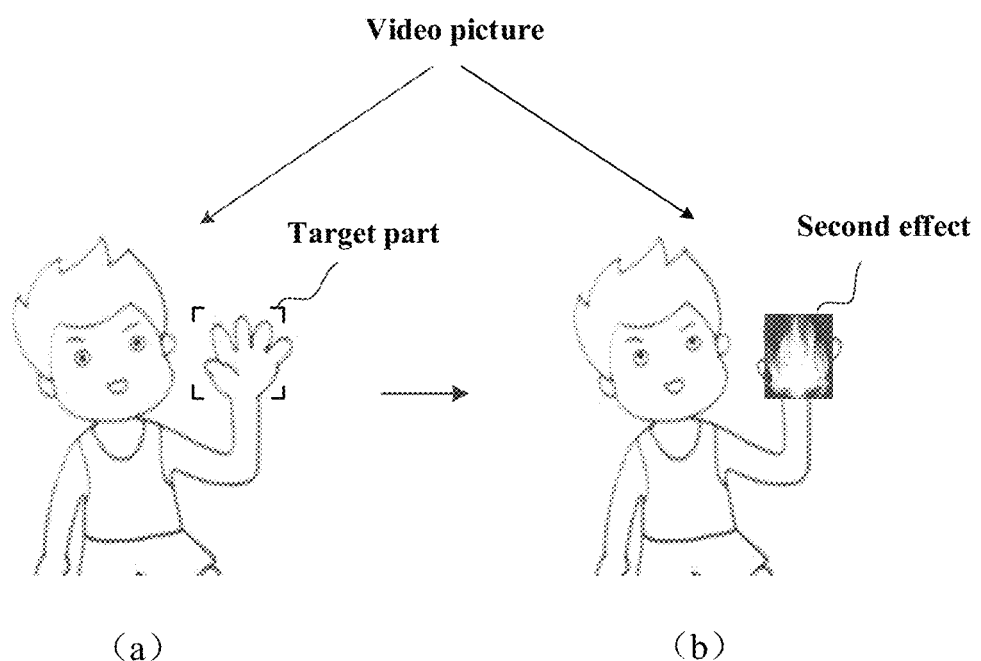
FIG. 4 is a schematic diagram of adding a second effect to a video picture by a server.

FIG. 4 is a schematic diagram of adding a second effect to a video picture by a server. As shown in (a) in FIG. 4, after the server receives the video transmitted by the terminal device and the coordinate information of the target part in each video picture, for each video picture, a flame effect of the server is displayed at the coordinates in the video picture. In this way, the flame effect is added to the target part of the video picture, and the video picture shown in (b) in FIG. 4 is obtained.

Alternatively, after each video picture is processed, the server may combine all the video pictures added with the second effects, so as to obtain the target video.

It should be understood that the coordinate information in each video picture is obtained according to the interaction actions of the user with the first effect in the shooting process. A position where the second effect is added is the same as that of the first effect for the same video picture. Therefore, after the second effect is added to each video picture of the video, the obtained target video may also achieve the interactivity of an effect. Meanwhile, due to a better rendering effect of the second effect added by the server, the rendering quality of the target video can be improved.

Figure 5:
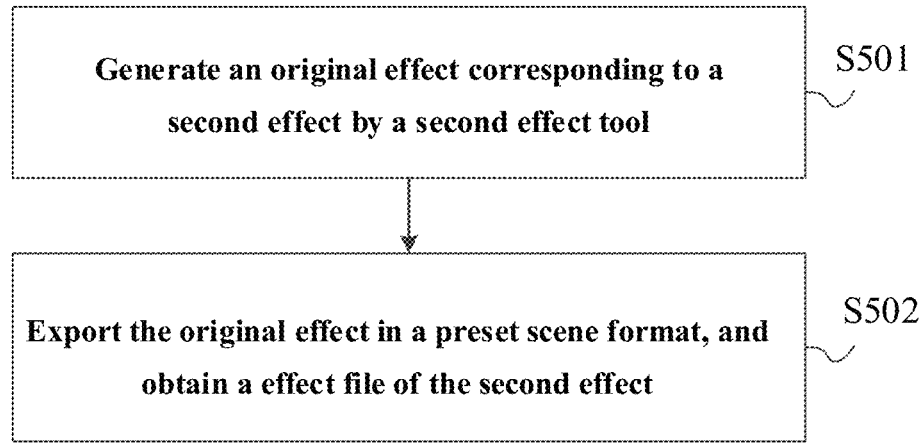
FIG. 5 is a schematic flow diagram of producing an effect file of a second effect according to an embodiment of the disclosure.

Then, a generation process of the effect file of the first effect of the terminal device and the effect file of the second effect of the server will be explained in combination with specific embodiments:

First, the solution of producing the effect file of the second effect will be explained. FIG. 5 is a schematic flow diagram of producing an effect file of a second effect according to an embodiment of the disclosure. With reference to FIG. 5, the solution includes the following steps:

S501, an original effect corresponding to the second effect is generated by a second effect tool.

It should be understood that the specific type of the second effect tool is not specifically limited by the embodiments of the disclosure. For example, the second effect tool may be an effect producing tool such as Blender, Maya, 3D Studio Max, AmazingEngine, and Game Engines.

The method for producing the original effect with the effect producing tools will not be repeated in the embodiment of the disclosure.

S502, the original effect is exported in a preset scene format, and an effect file of the second effect is obtained.

Still with the preset scene format as an example, in the step, the original effect generated in the above step is exported in a USD format, that is, the effect file of the second effect may be obtained.

Further, the effect file of the second effect is stored in a storage space of the server, and when the second effect is added to a video picture, the effect file of the second effect may be obtained from the storage space, such that rendering is completed.

Figure 6:
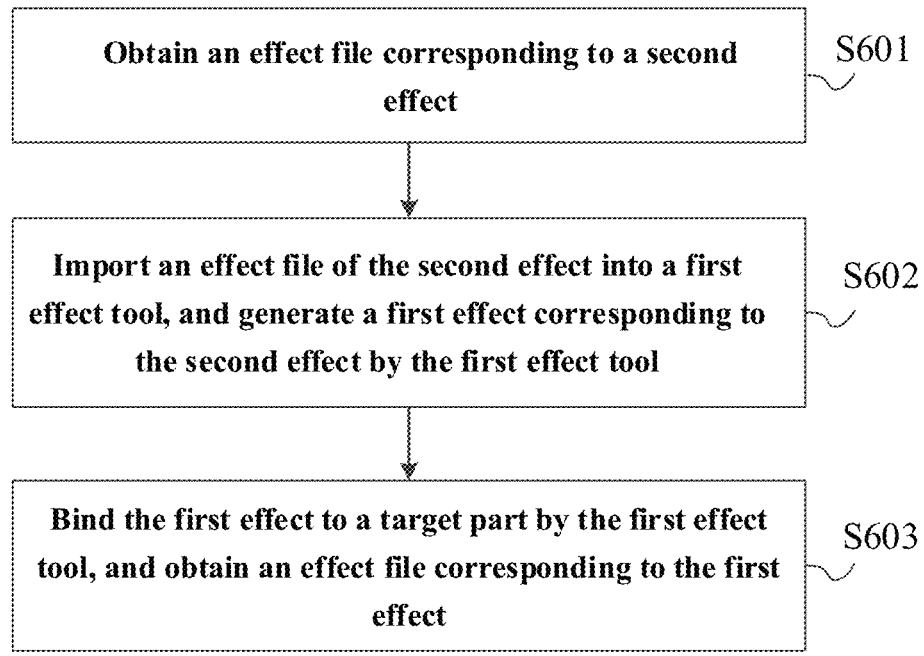
FIG. 6 is a schematic flow diagram of producing an effect file of a first effect according to an embodiment of the disclosure.

FIG. 6 is a schematic flow diagram of producing an effect file of a first effect according to an embodiment of the disclosure. With reference to FIG. 6, the solution includes the following steps:

S601, an effect file corresponding to a second effect is obtained.

It should be understood that the method for obtaining the effect file corresponding to the second effect is shown in the solution of the embodiment shown in FIG. 5, which will not be repeated herein.

S602, the effect file of the second effect is imported into a first effect tool, and a first effect corresponding to the second effect is generated by the first effect tool.

It should be noted that the specific type of the first effect tool is not limited by the embodiments of the disclosure, and the first effect tool is, for example, a tool capable of producing augmented reality (AR) effects, such as AR Tools.

For example, if the first effect tool is AR Tools, in the step, the effect file of the second effect is imported into the AR Tools, and a rendering method of the first effect corresponding to a rendering method of the second effect is determined by means of the AR Tools according to a preset correspondence, such that the first effect is generated according to the rendering method.

In practical application, with reference to a correspondence shown in the following table, the rendering method of the first effect corresponding to the second effect may be determined according to the rendering method of the second effect:

| Rendering method of the second effect | Rendering method of the first effect |
| --- | --- |
| Principled PBR | Standard PBR |
| Reflection rendering | Reflection rendering of screen space |
| Refraction rendering | Refraction rendering of screen space |
| GI rendering | Static baking or screen space GI |
| AO rendering | SSAO rendering |
| Self-luminous rendering | Floodlight rendering and point light rendering |
| Area light rendering | Point light rendering |
| Sun rendering | Directional light rendering |
| Skydome rendering | Skybox rendering and environment mapping rendering |

S603, the first effect is bound to a target part by the first effect tool, and an effect file corresponding to the first effect is obtained.

In this step, after the first effect is obtained, the effect file of the first effect is imported into the first effect tool, and meanwhile, 3D data of the target part is also imported into the first effect tool, such that the first effect is bound to the target part by the first effect tool according to the 3D data of the target part, and the effect file corresponding to the first effect is obtained.

Figure 7:
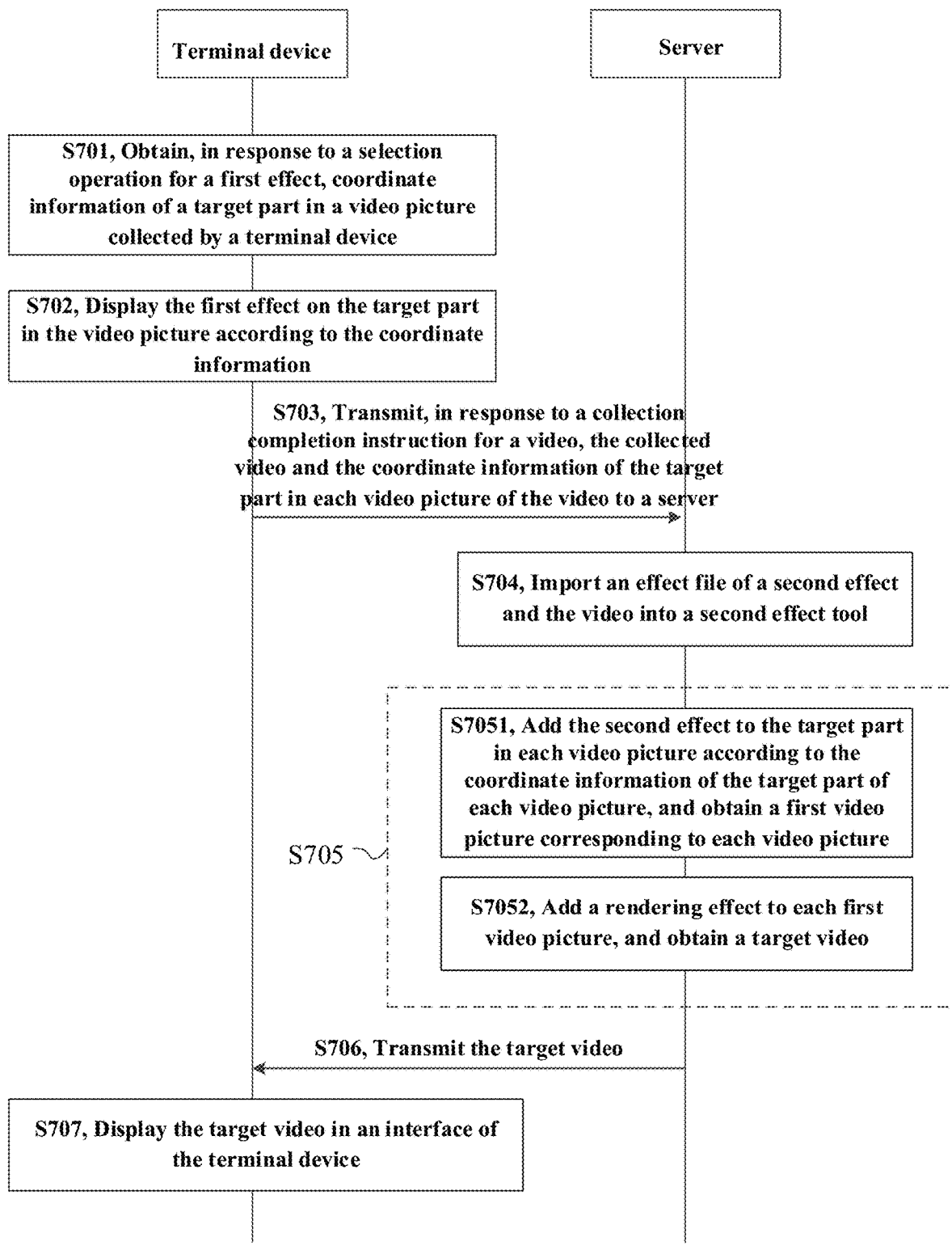
FIG. 7 is a second schematic interaction diagram of a video processing method according to an embodiment of the disclosure.

FIG. 7 is a second schematic interaction diagram of a video processing method according to an embodiment of the disclosure. On the basis of the embodiment shown in FIG. 2, the video processing method according to the embodiment of the disclosure will be explained in more detail through FIG. 7. With reference to FIG. 7, a video processing method according to an embodiment of the disclosure includes the following steps:

S701, in response to a selection operation for a first effect, a terminal device obtains coordinate information of a target part in a video picture collected by the terminal device.

S702, the terminal device displays the first effect on the target part in the video picture according to the coordinate information.

S703, in response to a collection completion instruction for a video, the terminal device transmits the collected video and the coordinate information of the target part in each video picture of the video to a server.

The solution of S701-S703 is similar to S201-S203 in the embodiment shown in FIG. 2, and reference may be made to the above embodiments for the specific solution, which will not be repeated herein.

S704, the server imports an effect file of a second effect and the video into a second effect tool.

S705, the server adds the second effect to the target part of each video picture in the video by the second effect tool according to the coordinate information of the target part in each video picture, and obtains the target video.

In some embodiments, after the server obtains the video, the server determines the second effect according to the first effect, obtains the effect file corresponding to the second effect in a storage space of the server, and imports the effect file of the second effect, the received video and the coordinate information of the target part of each video picture into the second effect tool. The second effect to the target part of each video picture is added by the second effect tool, and the target video is generated.

Alternatively, a rendering effect may be added while the second effect is added to each video picture, such that the rendering effect of the video picture is further improved. Then, the solution is explained in detail in combination with S7051-S7052:

S7051, the second effect is added to the target part of each video picture according to the coordinate information of the target part in each video picture, and a first video picture corresponding to each video picture is obtained.

S7052, the rendering effect is added to each first video picture, and a target video is obtained.

The rendering effect is generated by the second effect tool, and an effect file of the rendering effect is in a preset scene format. The solution and principle of generating the rendering effect by the second effect tool are similar to those of generating the second effect. Reference may be made to the embodiment shown in FIG. 5 for details, which will not be repeated herein.

In some embodiments, each second effect corresponds to a different rendering effect. Taking a flame effect as an example, a rendering effect corresponding to the flame effect may be an effect such as smoke, spark, or halo. In this step, after the first video picture is obtained, the rendering effect is determined according to a correspondence between the second effect and the rendering effect, and the rendering effect is added to the first video picture. After the second effect and the rendering effect are added to each first video picture, all the first video pictures are combined into the target video.

In the embodiment of the disclosure, the rendering effect is added to the video picture, such that the second effect can be more realistic, and the rendering effect of the video picture of the target video can be improved.

S706, the server transmits the target video to the terminal device.

S707, the target video is displayed in an interface of the terminal device.

Figure 8:
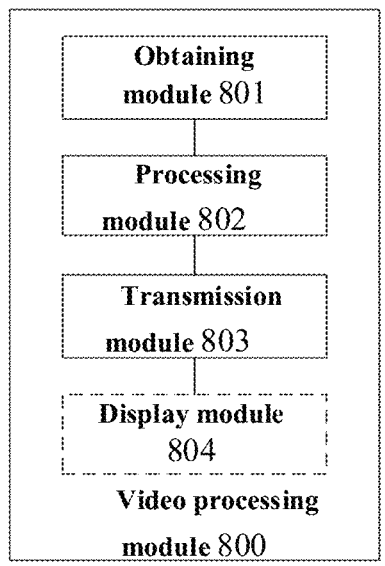
FIG. 8 is a first schematic structural diagram of a video processing apparatus according to an embodiment of the disclosure.

Corresponding to the video processing method according to the above embodiments, FIG. 8 is a first schematic diagram of a video processing apparatus according to an embodiment of the disclosure. The video processing apparatus is applied to the terminal device. For convenience of description, only the parts related to the embodiments of the disclosure are shown. As shown in FIG. 8, the video processing apparatus 800 includes:

an obtaining module 801 configured to obtain, in response to a selection operation for a first effect, coordinate information of a target part in a video picture collected by the terminal device;

a processing module 802 configured to display the first effect on the target part in the video picture according to the coordinate information; and a transmission module 803 configured to transmit, in response to a collection completion instruction for a video, the collected video and the coordinate information of the target part in each video picture of the video to a server to obtain a target video output by the server, where the target video is generated by adding a second effect corresponding to the first effect to the target part of each video picture by the server according to the coordinate information, and effect files of both the first effect and the second effect are in a preset scene format.

In an embodiment of the disclosure, the effect file of the first effect is obtained through the following: obtaining the effect file corresponding to the second effect; importing the effect file of the second effect into a first effect tool, and generating a first effect corresponding to the second effect by the first effect tool; and bounding the first effect to the target part by the first effect tool, and obtaining the effect file corresponding to the first effect.

In an embodiment of the disclosure, the video processing apparatus 800 further includes: a display module 804 configured to display the target video in an interface of the terminal device.

The video processing apparatus according to the embodiments of the disclosure may be configured to execute the technical solutions, executed by the terminal device, of the video processing method, and has similar implementation principles and technical effects to those of the method, which will not be repeated herein.

Figure 9:
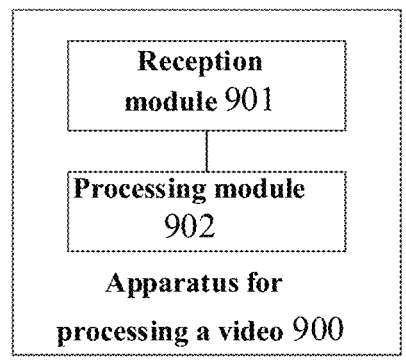
FIG. 9 is a second schematic structural diagram of a video processing apparatus according to an embodiment of the disclosure.

Corresponding to the video processing method according to the above embodiments, FIG. 9 is a second schematic diagram of a video processing apparatus according to an embodiment of the disclosure. The video processing apparatus is applied to a server. For convenience of description, only the parts related to the embodiment of the disclosure are shown. As shown in FIG. 9, the video processing apparatus 900 includes:

a reception module 901 configured to receive a video and coordinate information transmitted by a terminal device, where the coordinate information is coordinate information of a target part in each video picture of the video; and a processing module 902 configured to add a second effect corresponding to a first effect to the target part of each video picture of the video according to the coordinate information, and obtain a target video, where the first effect is an effect added by the terminal device to the target part, and effect files of both the first effect and the second effect are in a preset scene format.

In an embodiment of the disclosure, the effect file of the second effect is obtained through the following: generating an original effect corresponding to the second effect by a second effect tool; and exporting the original effect in the preset scene format, and obtaining the effect file of the second effect.

In an embodiment of the disclosure, the processing module 902 is specifically configured to import the effect file of the second effect and the video into the second effect tool; and add the second effect to the target part of each video picture in the video by the second effect tool according to the coordinate information of the target part in each video picture, and obtain the target video.

In an embodiment of the disclosure, the processing module 902 is specifically configured to add the second effect to the target part of each video picture according to the coordinate information of the target part in each video picture, and obtain a first video picture corresponding to each video picture; and add a rendering effect to each first video picture, and obtain the target video, where the rendering effect is generated by the second effect tool, and an effect file of the rendering effect is in the preset scene format.

In an embodiment of the disclosure, the preset scene format includes a universal scene description (USD).

The video processing apparatus according to the embodiment of the disclosure may be configured to execute the technical solutions, executed by the server, of the video processing method, and has similar implementation principles and technical effects to those of the method, which will not be repeated herein.

Figure 10:
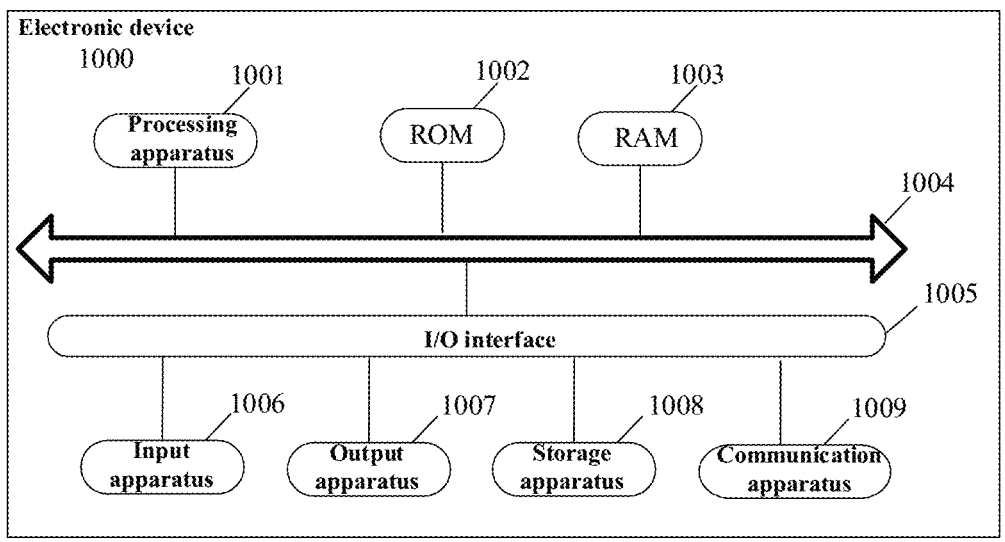
FIG. 10 is a schematic diagram of an electronic device according to an embodiment of the disclosure.

FIG. 10 is a schematic structural diagram of an electronic device according to an embodiment of the disclosure. A schematic structural diagram of an electronic device 1000 suitable for implementing the embodiment of the disclosure is shown. The electronic device 1000 may be the terminal device or the server described above. The terminal device may be, but is not limited to, a mobile terminal such as a mobile phone, a notebook computer, a digital broadcast receiver, a personal digital assistant (PDA), a portable android device (PAD), a portable media player (PMP), or a vehicle-mounted terminal (for example, a vehicle-mounted navigation terminal), and a fixed terminal such as a digital television (TV) or a desktop computer; the server may be an independent server, or a service cluster, which are not limited herein.

It should be understood that the electronic device shown in FIG. 10 is only illustrative, and is not intended to limit functions and a use scope of the embodiments of the disclosure.

As shown in FIG. 10, the electronic device 1000 may include a processing apparatus (for example, a central processing unit or a graphics processing unit) 1001, which may execute various appropriate actions and processing according to a program stored in a read only memory (ROM) 1002 or a program loaded from a storage apparatus 1008 to a random access memory (RAM) 1003. The RAM 1003 further stores various programs and data required for operations of the electronic device 1000. The processing apparatus 1001, the ROM 1002 and the RAM 1003 are connected to one another by means of a bus 1004. An input/output (I/O) interface 1005 is also connected to the bus 1004.

Generally, the following apparatuses may be connected to the I/O interface 1005: an input apparatus 1006 including, for example, a touch screen, a touch pad, a keyboard, a mouse, a camera, a microphone, an accelerometer, a gyroscope, etc.; an output apparatus 1007 including, for example, a liquid crystal display (LCD), a speaker, a vibrator, etc.; the storage apparatus 1008 including, for example, a magnetic tape, a hard disk, etc.; and a communication apparatus 1009. The communication apparatus 1009 may allow the electronic device 1000 to be in wireless or wired communication with other devices for data exchange. Although FIG. 10 shows the electronic device 1000 including various apparatuses, it should be understood that not all the apparatuses shown are required to be implemented or included. More or fewer apparatuses may be alternatively implemented or included.

Particularly, according to the embodiment of the disclosure, the process described above with reference to the flow diagram may be implemented as a computer software program. For example, an embodiment of the disclosure includes a computer program product, which includes a computer program carried by a computer-readable medium. The computer program includes a program code configured to execute the method shown in the flow diagram. In such an embodiment, the computer program may be downloaded and installed from a network through the communication apparatus 1009, or installed from the storage apparatus 1008, or installed from the ROM 1002. The computer program executes the functions defined in the method according to the embodiment of the disclosure when being executed by the processing apparatus 1001.

It should be noted that the computer-readable medium described in the disclosure may be a computer-readable signal medium, or a computer-readable storage medium, or any combination thereof. For example, the computer-readable storage medium may be, but is not limited to, an electronic, magnetic, optical, electromagnetic, infrared, or semiconductor system, apparatus, or device, or any suitable combination thereof. More specific examples of the computer-readable storage medium may include, but are not limited to, an electrical connection having one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device.

In the disclosure, the computer-readable signal medium may include a data signal in a baseband or as part of a carrier for transmission, and the data signal carries a computer-readable program code. The transmitted data signal may be in various forms, which may be, but is not limited to, an electromagnetic signal, an optical signal, or any suitable combination thereof. The computer-readable signal medium may further be any computer-readable medium other than the computer-readable storage medium. The computer-readable signal medium may transmit, propagate or transmit a program used by or in combination with an instruction execution system, apparatus or device. The program code included in the computer-readable medium may be transmitted by any suitable medium, which may be, but is not limited to, an electric wire, an optical cable, radio frequency (RF), etc., or any suitable combination thereof.

The computer-readable medium may be included in the electronic device, or may exist independently without being assembled into the electronic device.

The computer-readable medium carries one or more programs. The one or more programs cause the electronic device to execute the video processing method shown in the embodiments when executed by the electronic device.

In some embodiments, a computer program code configured to execute an operation of the disclosure may be written in one or more programming languages or a combination thereof. The programming languages include object-oriented programming languages such as Java, Smalltalk, and C++, and further include conventional procedural programming languages such as "C" or similar programming languages. The program code may be executed entirely on a user computer, executed partially on a user computer, executed as a stand-alone software package, executed partially on a user computer and partially on a remote computer, or executed entirely on the remote computer or a server. In the case involving the remote computer, the remote computer may be connected to the user computer through any type of networks including a local area network (LAN) or a wide area network (WAN), or may be connected to an external computer (for example, connected through the Internet by an Internet service provider).

The flow diagrams and block diagrams in the accompanying drawings illustrate system structures, functions and operations, which may be achieved according to systems, methods and computer program products in all the embodiments of the disclosure. In view of that, each block in the flow diagrams or block diagrams may represent a module, a program segment, or part of a code, which includes one or more executable instructions configured to implement specified logic functions. It should further be noted that in some alternative implementations, the functions noted in the blocks may also occur in an order different from that in the accompanying drawings. For example, the functions represented by two continuous blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the embodiments described in the disclosure may be implemented by software or hardware. Names of the units do not limit the units themselves in some cases. For example, a first obtaining unit may also be described as "a unit obtaining at least two Internet protocol addresses".

The functions described herein may be at least partially executed by one or more hardware logic components. For example, for the non-limitative purposes, illustrative types of hardware logic components that may be used include: a field programmable gate array (FPGA), an application specific integrated circuit (ASIC), an application specific standard product (ASSP), a system on chip (SOC), complex programmable logic devices (CPLDs), etc.

In the context of the disclosure, the machine-readable medium may be a tangible medium, which may include or store a program used by or used in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination thereof.

What are described above are merely illustrative of preferred embodiments of the disclosure and principles of the technology employed. Those skilled in the art should understand that the disclosure scope of the disclosure is not limited to the technical solution formed by a specific combination of the technical features described above, and should further cover other technical solutions formed by any combination of the technical features described above or their equivalent features without departing from the disclosed concept, for example, the technical solution formed by interchanging the features with the (non-limitative) technical features having similar functions disclosed in the disclosure or vice versa.

Further, although operations are depicted in a particular order, it should be understood that the operations are not required to be executed in the particular order shown or in a sequential order. In some cases, multitasking and parallel processing may be advantageous. Likewise, although several specific implementation details are included in the above discussion, the details should not be construed as limiting the scope of the disclosure. Some features described in the context of separate embodiments may also be implemented in combination in a single embodiment. On the contrary, various features described in the context of a single embodiment may also be implemented in a plurality of embodiments independently or in any suitable sub-combination manner.

Although the subject is described in languages of specific structural features and/or methodological logic actions, it should be understood that the subject defined in the appended claims is not necessarily limited to the specific features or actions described above. On the contrary, the specific features and actions described above are merely illustrative forms for implementing the claims.

We claim:

1. A video processing method, applied to a terminal device, the method video processing comprising:
   obtaining, in response to a selection operation for a first effect, coordinate information of a target part in a video picture collected by the terminal device;
   displaying the first effect on the target part in the video picture according to the coordinate information; and
   transmitting, in response to a collection completion instruction for a video, the collected video and the coordinate information of the target part in each video picture of the video to a server to obtain a target video output by the server, wherein the target video is generated by the server by adding a second effect corresponding to the first effect to the target part of each video picture according to the coordinate information, and effect files of both the first effect and the second effect are in a preset scene format.

2. The video processing method according to claim 1, wherein the effect file of the first effect is obtained through the following:
   obtaining the effect file corresponding to the second effect;
   importing the effect file of the second effect into a first effect tool, and generating the first effect corresponding to the second effect by the first effect tool; and
   binding the first effect to the target part by the first effect tool, and obtaining the effect file corresponding to the first effect.

3. The video processing method according to claim 1, further comprising:
   displaying the target video in an interface of the terminal device.

4. The video processing method according to claim 1, wherein the preset scene format comprises a universal scene description (USD).

5. A video processing method, applied to a server, the method comprising:
   receiving a video and coordinate information transmitted by a terminal device, wherein the coordinate information is coordinate information of a target part in each video picture of the video; and
   adding a second effect corresponding to a first effect to the target part of each video picture in the video according to the coordinate information, and obtaining a target video, wherein the first effect is an effect added by the terminal device to the target part, and effect files of both the first effect and the second effect are in a preset scene format.

6. The video processing method according to claim 5, wherein the effect file of the second effect is obtained through the following:
   generating an original effect corresponding to the second effect by a second effect tool; and
   exporting the original effect in the preset scene format, and obtaining the effect file of the second effect.

7. The video processing method according to claim 5, wherein adding a second effect corresponding to a first effect to the target part of each video picture in the video according to the coordinate information, and obtaining a target video comprise:
   importing the effect file of the second effect and the video into the second effect tool; and adding the second effect to the target part of each video picture in the video by the second effect tool according to the coordinate information of the target part in each video picture, and obtaining the target video.

8. The video processing method according to claim 7, wherein the adding the second effect to the target part of each video picture in the video according to the coordinate information of the target part of each video picture, and obtaining the target video comprise:
adding the second effect to the target part of each video picture according to the coordinate information of the target part of each video picture, and obtaining a first video picture corresponding to each video picture; and
adding a rendering effect to each first video picture, and obtaining the target video, wherein the rendering effect is generated by means of the second effect tool, and an effect file of the rendering effect is in the preset scene format.

9. The video processing method according to claim 5, wherein the preset scene format comprises a universal scene description (USD).

10. An electronic device, comprising: at least one processor and a memory, wherein
the memory stores a computer-executable instruction; and
the computer-executable instruction stored in the memory, when executed by the at least one processor, causes the at least one processor to:
receive a video and coordinate information transmitted by a terminal device, wherein the coordinate information is coordinate information of a target part in each video picture of the video; and
add a second effect corresponding to a first effect to the target part of each video picture in the video according to the coordinate information, and obtain a target video, wherein the first effect is an effect added by the terminal device to the target part, and effect files of both the first effect and the second effect are in a preset scene format.

11. The electronic device according to claim 10, wherein the at least one processor is caused to obtain effect file of the second effect through the following:
generate an original effect corresponding to the second effect by a second effect tool; and
export the original effect in the preset scene format, and obtain the effect file of the second effect.

12. The electronic device according to claim 10, wherein when adding a second effect corresponding to a first effect to the target part of each video picture in the video according to the coordinate information, and obtaining a target video comprise, the at least one processor is caused to:
import the effect file of the second effect and the video into the second effect tool; and
add the second effect to the target part of each video picture in the video by the second effect tool according to the coordinate information of the target part in each video picture, and obtain the target video.

13. The electronic device according to claim 12, wherein when adding the second effect to the target part of each video picture in the video according to the coordinate information of the target part of each video picture, and obtaining the target video, the at least one processor is caused to:
add the second effect to the target part of each video picture according to the coordinate information of the target part of each video picture, and obtain a first video picture corresponding to each video picture; and
add a rendering effect to each first video picture, and obtain the target video, wherein the rendering effect is generated by means of the second effect tool, and an effect file of the rendering effect is in the preset scene format.

14. The electronic device according to claim 10, wherein the preset scene format comprises a universal scene description (USD).

\* \* \* \* \*